(12) United States Patent
Uehara et al.

(10) Patent No.: US 9,251,733 B2
(45) Date of Patent: Feb. 2, 2016

(54) DISPLAY PANEL, DISPLAY DEVICE, AND ELECTRONIC UNIT

(71) Applicant: Japan Display Inc., Tokyo (JP)

(72) Inventors: Toshinori Uehara, Tottori (JP); Hideki Kaneko, Tottori (JP); Kojiro Ikeda, Tottori (JP); Daichi Suzuki, Tottori (JP)

(73) Assignee: JAPAN DISPLAY INC., Tokyo (JP)

( * ) Notice: Subject to any disclaimer, the term of this patent is extended or adjusted under 35 U.S.C. 154(b) by 0 days.

(21) Appl. No.: 14/755,637

(22) Filed: Jun. 30, 2015

(65) Prior Publication Data

US 2015/0302791 A1 Oct. 22, 2015

Related U.S. Application Data

(63) Continuation of application No. 13/449,497, filed on Apr. 18, 2012, now Pat. No. 9,106,904.

(30) Foreign Application Priority Data

Apr. 28, 2011 (JP) ................. 2011-101412

(51) Int. Cl.
*G09G 3/30* (2006.01)
*H05B 33/12* (2006.01)
*H05B 33/06* (2006.01)
*H04N 13/04* (2006.01)

(52) U.S. Cl.
CPC .............. *G09G 3/30* (2013.01); *H05B 33/06* (2013.01); *H05B 33/12* (2013.01); *G09G 2300/0443* (2013.01); *H04N 13/0409* (2013.01); *H04N 13/0422* (2013.01)

(58) Field of Classification Search
None
See application file for complete search history.

(56) References Cited

U.S. PATENT DOCUMENTS

| 2008/0043092 A1 | 2/2008 | Evans et al. |
| 2010/0097525 A1 | 4/2010 | Mino |
| 2011/0007390 A1 | 1/2011 | Yanamoto |

FOREIGN PATENT DOCUMENTS

| CN | 1619359 | 5/2005 |
| CN | 101049028 | 10/2007 |
| EP | 1521483 | 4/2005 |
| GB | 2415850 | 1/2006 |
| JP | 08-106070 | 4/1996 |
| JP | 09-281440 | 10/1997 |

(Continued)

OTHER PUBLICATIONS

Extended European Search Report issued in connection with related European Patent Application No. EP 12164910 dated Jan. 8, 2013.
Japanese Office Examination Report issued in connection with related Japanese Patent Application No. 2011-101412 dated Apr. 30, 2014.

(Continued)

*Primary Examiner* — Richard Kim
(74) *Attorney, Agent, or Firm* — Dentons US LLP

(57) ABSTRACT

A display panel including: a panel section including a display region where a plurality of pixels are arranged, and a gap region provided in a gap between the pixels; and a barrier section including a plurality of transmissive regions in a two-dimensional arrangement, and a light-blocking region to be around each of the transmissive regions. The transmissive regions are each configured to make entirely visible any one of the pixels therethrough when a viewer views the panel section not from a front but from a first or second direction via the barrier section, the pixels are each configured by a plurality of sub-pixels varying in type, and the sub-pixels in each of the pixels are arranged not in stripes but differently.

7 Claims, 7 Drawing Sheets

(56) References Cited

FOREIGN PATENT DOCUMENTS

| | | |
|---|---|---|
| JP | 2005-110010 | 4/2005 |
| JP | 2010-276817 | 12/2010 |
| WO | WO 2005/027089 A1 | 3/2005 |

OTHER PUBLICATIONS

European Search Report issued in connection with related European Patent Application No. EP 12 164910.7 dated Sep. 1, 2014.

Chinese Office Examination Report issued in connection with related Chinese Patent Application No. CN 201210114873.6 mailed Jan. 22, 2015 with English translation.

DISPLAY PANEL, DISPLAY DEVICE, AND ELECTRONIC UNIT

RELATED APPLICATION DATA

This application is a continuation of U.S. patent application Ser. No. 13/449,497 filed Apr. 18, 2012, the entirety of which is incorporated herein by reference to the extent permitted by law. The present application claims the benefit of priority to Japanese Patent Application No. JP 2011-101412 filed on Apr. 28, 2011 in the Japan Patent Office, the entirety of which is incorporated by reference herein to the extent permitted by law.

BACKGROUND

The present technology relates to a display panel capable of multi-view display allowing viewing of two-dimensional (2D) image (planar image) that looks different depending on from which perspective the image is viewed. The present technology relates also to a display device provided with such a display panel, and an electronic unit provided with the display device described above.

A display device capable of multi-view display or three-dimensional (3D) display has been recently in practical use. Such a display device is known to include a barrier layer on a display region of a display panel, for example. As an exemplary barrier layer, Japanese Unexamined Patent Application Publication No. 9-281440 describes a barrier layer including a plurality of transmissive slits each separated by a light-blocking region. As another example, Japanese Unexamined Patent Application Publication No. 8-106070 describes a barrier liquid crystal display with which a light-blocking region is generated in response to application of a voltage to a liquid crystal material.

SUMMARY

The issue here is that, for the provision of such a barrier layer, the slits thereof are sometimes reduced in width to be equal to that of a sub-pixel. If this is the case, however, the distance between the pixels and the barrier layer is reduced, and this results in a smaller processing margin at the time of processing a CF (Color Filter) substrate of a display panel until the thickness thereof becomes suitable for the distance. In consideration thereof, a possibility is to increase the slit width to be equal to the width of two or more sub-pixels. If the width is increased as such, however, a phenomenon of color moiré may occur when the display panel is viewed from a direction that is not an appropriate-viewing direction. The "color moiré" is a phenomenon observed when the direction of viewing the display panel is changed by degrees in the horizontal plane, and is caused by the resulting similarity of color appearing in the slits and color disappearing therefrom, whereby this looks like glare.

As a measure for the disadvantage described above, a possibility is to change the position of the slits. However, if such a position change causes the sub-pixels visible from each slit to belong to different pixels, the resulting image looks slightly different from the original image. With the measure described above, there thus has been a disadvantage of degradation of the image quality.

It is thus desirable to provide a display panel capable of suppressing degradation of the image quality at the time of multi-view display, and a display device provided with the display panel, and an electronic unit provided with the display device.

According to an embodiment of the present disclosure, there is provided a display panel including: a panel section including a display region where a plurality of pixels are arranged, and a gap region provided in a gap between the pixels; and a barrier section including a plurality of transmissive regions in a two-dimensional arrangement, and a light-blocking region to be around each of the transmissive regions. The transmissive regions are each configured to make entirely visible any one of the pixels therethrough when a viewer views the panel section not from a front but from a first or second direction via the barrier section, the pixels are each configured by a plurality of sub-pixels varying in type, and the sub-pixels in each of the pixels are arranged not in stripes but differently.

According to another embodiment of the present disclosure, there is provided a display device including: a panel section including a display region where a plurality of pixels are arranged, and a gap region provided in a gap between the pixels; a barrier section including a plurality of transmissive regions in a two-dimensional arrangement, and a light-blocking region to be around each of the transmissive regions; and a drive section driving the panel section or both the panel section and the barrier section. The transmissive regions are each of a size allowing viewing of any one of the pixels entirely therethrough when a viewer views the panel section not from a front but from a first or second direction via the barrier section, the pixels are each configured by a plurality of sub-pixels varying in type, and the sub-pixels in each of the pixels are arranged not in stripes but differently.

According to still another embodiment of the present disclosure, there is provided an electronic unit with a display device, the display device including: a panel section including a display region where a plurality of pixels are arranged, and a gap region provided in a gap between the pixels; a barrier section including a plurality of transmissive regions in a two-dimensional arrangement, and a light-blocking region to be around each of the transmissive regions; and a drive section driving the panel section or both the panel section and the barrier section. The transmissive regions are each configured to make entirely visible any one of the pixels therethrough when a viewer views the panel section not from a front but from a first or second direction via the barrier section, the pixels are each configured by a plurality of sub-pixels varying in type, and the sub-pixels in each of the pixels are arranged not in stripes but differently.

With the display panel, the display device, and the electronic unit according to the embodiments of the present disclosure, the transmissive regions of the barrier section are each configured to make entirely visible any one pixel therethrough when viewed from the first or second direction. Therefore, the sub-pixels visible in the transmissive region belong to the same pixel. Moreover, the sub-pixels in each of the pixels are arranged not in stripes but differently. Therefore, the color moiré is reduced without displacing the transmissive regions not to match the pixel arrangement.

With the display panel, the display device, and the electronic unit according to the embodiments of the present disclosure, the pixels include a plurality of first pixels that are each visible through the corresponding transmissive region when viewed from the first direction, and a plurality of second pixels that are each visible through the corresponding transmissive region when viewed from the second direction. In this configuration, in two of the first pixels adjacent to each other in the vertical or diagonal direction, the sub-pixels are preferably laid out differently. Moreover, in two of the second pixels adjacent to each other in the vertical or diagonal direction, the sub-pixels are preferably laid out differently. Therefore, the color moiré is reduced without displacing the transmissive regions not to match the pixel arrangement.

With the display panel, the display device, and the electronic unit according to the embodiments of the present disclosure, the light-blocking section is configured to include a first light-blocking section whose area is of the pixel level, and a second light-blocking section whose area is smaller than that of the first light-blocking section. In this configuration, preferably, the first and second light-blocking sections are arranged alternately in a two-dimensional plane. Moreover, the first and second light-blocking sections are preferably arranged alternately in the lateral direction with one of the pixels sandwiched therebetween. When the first and second light-blocking sections are arranged at such positions, the transmissive regions are preferably each provided at a position matching the corresponding first light-blocking section.

With the display panel, the display device, and the electronic unit according to the embodiments of the present disclosure, the sub-pixels visible in any of the slits belong to the same pixel when viewed from the first or second direction, and the color moiré is reduced without displacing the transmissive regions not to match the pixel arrangement. Therefore, degradation of the image quality at the time of multi-view display is allowed to be suppressed.

It is to be understood that both the foregoing general description and the following detailed description are exemplary, and are intended to provide further explanation of the technology as claimed.

BRIEF DESCRIPTION OF THE DRAWINGS

The accompanying drawings are included to provide a further understanding of the disclosure, and are incorporated in and constitute a part of this specification. The drawings illustrate embodiments and, together with the specification, serve to explain the principles of the technology.

DETAILED DESCRIPTION OF THE PREFERRED EMBODIMENT

In the below, an embodiment of the present disclosure is described in detail by referring to the accompanying drawings. Herein, a description is given in the following order.
1. Embodiment (FIGS. 1 to 3)
Example in which each pixel is configured by RGB, and a wide black section is provided
2. Modification Examples (FIGS. 4A to 6C)
Example in which each pixel is configured by RGGB, and a wide black section is provided
Example in which each pixel is configured by RGB, and a general black section is provided
Example in which each pixel is configured by RGGB, and is with a general black section
3. Application Example (FIG. 7)
Example in which a display device of Embodiment and Modification Examples described above is applied to an electronic unit 1. First Embodiment

Figure 1:
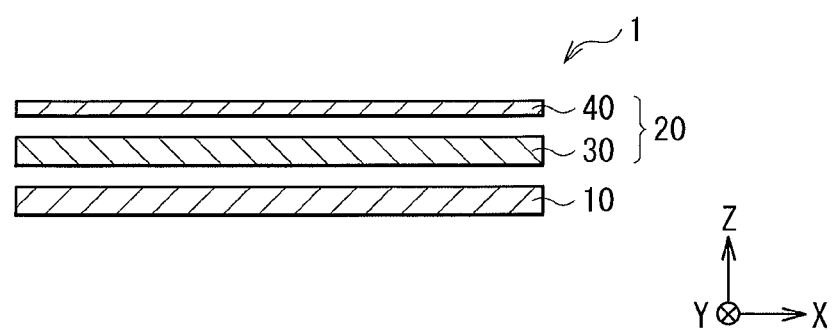
FIG. 1 is a diagram showing an exemplary cross-sectional configuration of a display device according to an embodiment of the present disclosure.

[Configuration]
FIG. 1 is a diagram showing an exemplary cross-sectional configuration of a display device 1 according to an embodiment of the present disclosure. Note that FIG. 1 is a schematic view, and the dimension and shape thereof are not necessarily the same as those in reality. The display device 1 includes a display panel 20, a backlight 10, and a drive circuit (not shown). The backlight 10 is disposed behind the display panel 20, and the drive circuit drives the display panel 20. The backlight 10 is a plane-emitting light source that illuminates the display panel 20 from the rear thereof. An upper surface of the display panel 20 serves as an image display surface. The display panel 20 includes a panel section 30, and a barrier section 40.

Figure 2A:
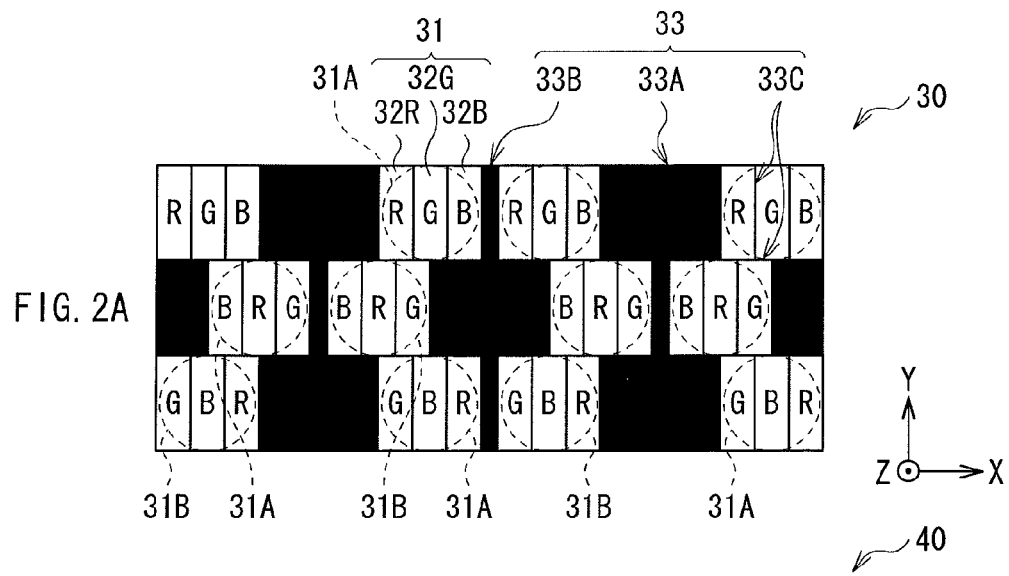
FIG. 2A is a diagram showing an exemplary configuration in a planar view of a panel section of FIG. 1.
Figure 2B:
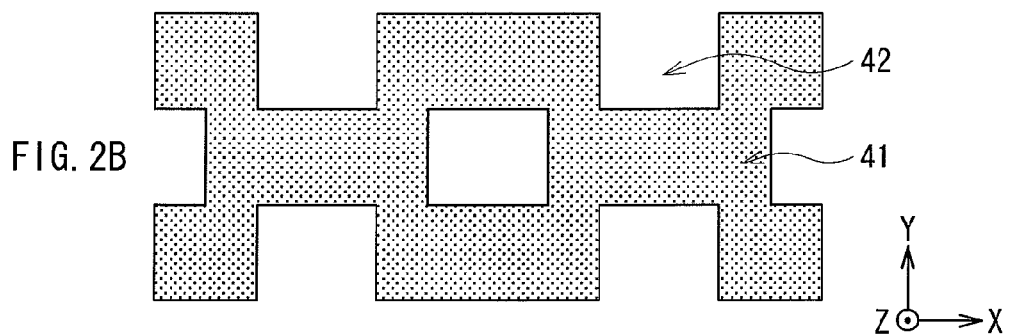
FIG. 2B is a diagram showing an exemplary configuration in a planar view of a barrier section of FIG. 1.
Figure 2C:
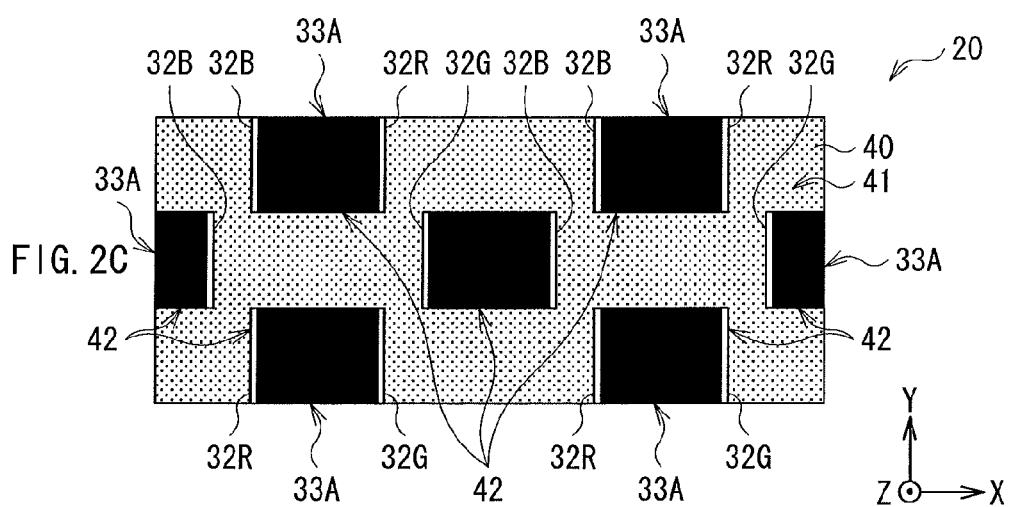
FIG. 2C is a diagram showing an exemplary combined configuration of the panel section of FIG. 2A and the barrier section of FIG. 2B in a planar view.

FIG. 2A is a diagram showing an exemplary configuration in a planar view of the panel section 30 of FIG. 1, FIG. 2B is a diagram showing an exemplary configuration in a planar view of the barrier section 40 of FIG. 1, and FIG. 2C is a diagram showing an exemplary combined configuration of the panel section 30 of FIG. 2A and the barrier section 40 of FIG. 2B in a planar view.

The panel section 30 is a transmissive panel in which each pixel 31 is driven according to an image signal coming from the outside. The panel section 30 is exemplified by a liquid crystal panel, an organic EL (Electro-Luminescence) panel, or a plasma panel. Note that when the panel section 30 has a self-emitting mechanism such as an organic EL panel or a plasma panel, the backlight 10 is not necessarily provided. The panel section 30 is in the shape of a square having four sides as shown in FIG. 2A, for example. In the below, as for the four sides of the panel section 30, the two opposing sides are assumed as being parallel to the horizontal direction, and the remaining two sides are assumed as being parallel to the perpendicular direction. Also in the below, the horizontal direction may be referred to as lateral direction or row direction, and the perpendicular direction may be referred to as vertical direction or column direction.

The panel section 30 includes a display region and ring-shaped frame regions. The display region includes a plurality of pixels 31 that are arranged two-dimensionally, and the frame regions are each located on the periphery of the corresponding pixel. The pixels 31 in the display region are each configured by a sub-pixel 32R for red, a sub-pixel 32G for green, and a sub-pixel 32B for blue as shown in FIG. 2A, for example. In the below, these sub-pixels 32R, 32G, and 32B are collectively referred to as sub-pixels 32.

The pixels 31 are not arranged in stripes but differently. In an exemplary arrangement, as shown in FIG. 2A, the pixels 31 are arranged alternately (in a staggered manner) in the column direction and in line in the row direction. In the pixels 31, the sub-pixels 32 are laid out differently on a row basis. As an example, the pixels 31 in a row each include the sub-pixels arranged in order of R, G, and B, the pixels 31 in another row each include the sub-pixels arranged in order of B, R, and G, and the pixels 31 in still another row each include the sub-pixels arranged in order of G, B, and R.

The panel section 30 includes a black section 33 being a light-blocking section between the pixels 31 and between the sub-pixels 32. As shown in FIG. 2A, for example, the black section 33 is located around each of the pixels 31, and includes light-blocking sections 33A and 33B. The area of the light-blocking section 33A is of the pixel level (the area is equal to or substantially equal to that of the pixel 31, for example), and the area of the light-blocking section 33B is smaller than that of the light-blocking section 33A. The light-blocking sections 33A and 33B are arranged alternately in the two-dimensional plane. As an exemplary arrangement, the light-blocking sections 33A and 33B are alternately arranged in the lateral direction (the row direction) with one pixel 31 sandwiched therebetween, and in the vertical direction (the column direction), are alternately arranged with no pixel 31 sandwiched therebetween.

As shown in FIG. 2A, for example, the black section 33 also includes a light-blocking section 33C between the sub-pixels 32 in the pixel 31. The area of the light-blocking section 33C is smaller than that of the light-blocking section 33B. The black section 33 includes such a light-blocking section 33C also between the pixels 31 positioned in the vertical direction (the column direction) with respect to each other.

The barrier section 40 is for blocking a part of the light (image light) coming from each of the pixels 31 of the panel section 30. With the barrier section 40 partially blocking the image light as such, a viewer is allowed to view 2D image (planar image) differently depending on from which appropriate-viewing direction the viewer views (the direction d1 or d2 that will be described later). In this sense, the display device 1 operates as a so-called dual-view display device.

As shown in FIG. 1, for example, the barrier section 40 is disposed at the position facing the panel section 30. The barrier section 40 is in such a barrier pattern as exemplarily shown in FIG. 2B, that is, a barrier pattern in which a plurality of transmissive regions 42 are arranged two-dimensionally, and a light-blocking region 41 is arranged to be around each of the transmissive regions 42.

The light-blocking region 41 is configured by a light-blocking member, for example. On the other hand, the transmissive regions 42 are each an aperture, for example. The transmissive regions 42 are arranged systematically in their entirety, and are arranged two-dimensionally in the row and column directions. As shown in FIG. 2B, for example, the transmissive regions 42 are so arranged as to be displaced by a half pitch on a row basis, and thus the light-blocking region 41 and the transmissive regions 42 are arranged roughly in a checkered pattern (in other words, alternately in the row and column directions), for example.

As for the transmissive region 42, as shown in FIG. 2B, for example, the area thereof is of the pixel level (the area is equal to or substantially equal to that of the pixel 31, for example), and the shape and size thereof are the same or almost the same as those of the pixel 31. As shown in FIG. 2B, for example, the transmissive regions 42 are arranged with a pitch of about three pixels in the row direction, and with a pitch of about two pixels in the column direction. In other words, any two transmissive regions 42 adjacent to each other in the row direction have a gap of about two pixels therebetween, and any two transmissive regions 42 adjacent to each other in the column direction have a gap of about one pixel therebetween.

The transmissive regions 42 are each disposed at the position matching the corresponding light-blocking section 33A, and as exemplarily shown in FIG. 2C, are each disposed at the position opposing to the corresponding light-blocking section 33A. On the other hand, the light-blocking region 41 is disposed at the position matching the pixels 31 and the light-blocking sections 33B and 33C, and as exemplarily shown in FIG. 2C, is disposed at the position opposing to the pixels 31 and the light-blocking sections 33B and 33C.

Figure 3:
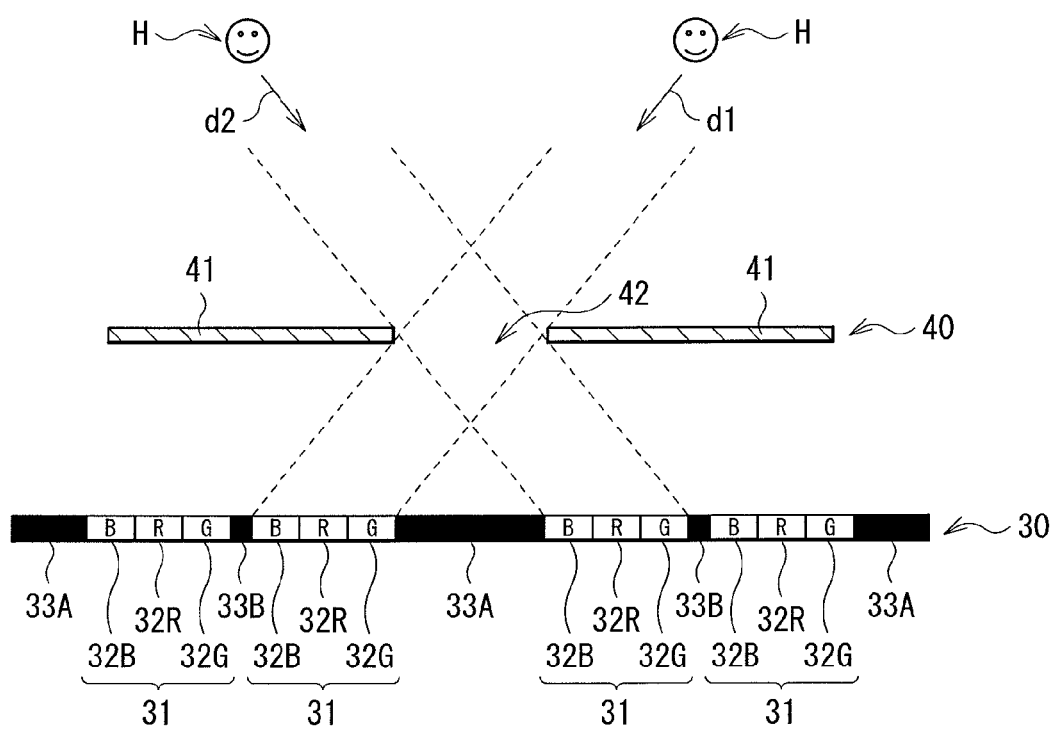
FIG. 3 is a schematic diagram for illustrating dual-view display in the display device of FIG. 1.

FIG. 3 is a diagram schematically showing the dual-view display in the display device 1. As shown in FIG. 3, the barrier section 40 is so disposed as to make visible any predetermined pixel 31 via the corresponding transmissive region 42 when a viewer H views the display panel 20 from the first appropriate-viewing direction d1. In other words, the transmissive regions 42 are each so configured as to allow entire viewing of any one pixel from one transmissive region 42 when the viewer H views the display panel 20 from the first appropriate-viewing direction d1. Herein, when the viewer H views the display panel 20 from the first appropriate-viewing direction d1, the pixel 31 visible from the corresponding transmissive region 42 as such is referred to as a first pixel 31A.

Also as shown in FIG. 3, the barrier section 40 is so disposed as to make visible any of the pixels 31 other than the first pixel 31A via the corresponding transmissive region 42 when the viewer H views the display panel 20 from the second appropriate-viewing direction d2. In other words, the transmissive regions 42 are each so configured as to allow entire viewing of any one pixel from one transmissive region 42 when the viewer H views the display panel 20 from the second appropriate-viewing direction d2. Herein, when the viewer H views the display panel 20 from the second appropriate-viewing direction d2, the pixel 31 visible from the corresponding transmissive region 42 as such is referred to as a second pixel 31B.

The first and second pixels 31A and 31B are alternately arranged in the lateral direction, and are alternately arranged also in the vertical direction. The first pixel 31A is located adjacent to the right of the light-blocking section 33A, and the second pixel 31B is located adjacent to the left thereof. Similarly, the first pixel 31A is located adjacent to the left of the light-blocking section 33B, and the second pixel 31B is located adjacent to the right thereof.

Herein, in the two first pixels 31A adjacent to each other in the vertical direction (in FIG. 2A, in the first pixel 31A in the first row and the first pixel 31A in the third row, for example), the sub-pixels 32 are laid out differently. Further, also in the two first pixels 31A adjacent to each other in the diagonal direction (in FIG. 2A, in the first pixel 31A in the first row and the first pixel 31A in the second row, for example), the sub-pixels 32 are laid out differently. Still further, in the two second pixels 31B adjacent to each other in the vertical direction (in FIG. 2A, in the second pixel 31B in the first row and the second pixel 31B in the third row, for example), the sub-pixels 32 are laid out differently. Still further, also in the two second pixels 31B adjacent to each other in the diagonal direction (in FIG. 2A, in the second pixel 31B in the first row and the second pixel 31B in the second row, for example), the sub-pixels 32 are laid out differently.

As shown in FIGS. 2C and 3, for example, when the transmissive regions 42 are each disposed at the position opposing to the corresponding light-blocking section 33A, the light-blocking sections 33A are visible via the transmissive regions 42 when the viewer H views the display panel 20 from the front.

In this case, as shown in FIG. 2C, for example, in a certain transmissive region 42 (referred to as transmissive region 42a (not shown)), when the viewer H views the display panel 20 from the front, he or she sees not only the light-blocking section 33A but also a part of the sub-pixels 32R and 32G from the sides thereof. The transmissive region 42a is arranged to correspond to the pixel row in which the pixels 31 each include the sub-pixels arranged in order of G, B, and R in the row direction.

Similarly, as shown in FIG. 2C, for example, in another transmissive region 42 (referred to as transmissive region 42b (not shown)), when the viewer H views the display panel 20 from the front, he or she sees not only the light-blocking section 33A but also a part of the sub-pixels 32R and 32B from the sides thereof. The transmissive region 42b is arranged to correspond to the pixel row in which the pixels 31 each include the sub-pixels arranged in order of R, G, and B in the row direction.

Moreover, also as shown in FIG. 2C, for example, in still another transmissive region 42 (referred to as transmissive region 42c (not shown)), when the viewer H views the display panel 20 from the front, he or she sees not only the light-blocking section 33A but also a part of the sub-pixels 32B and 32G from the sides thereof. The transmissive region 42c is arranged to correspond to the pixel row in which the pixels 31 each include the sub-pixels arranged in order of B, R, and G in the row direction.

When the viewing direction of the viewer H is changed from the first appropriate-viewing direction d1 to the second appropriate-viewing direction d2 with respect to the front, for example, the color appearing in the transmissive regions 42a, 42b, and 42c is different from the color disappearing therefrom. There thus is no possibility of causing color moiré when the viewing direction of the viewer H is changed from the first appropriate-viewing direction d1 to the second appropriate-viewing direction d2 with respect to the front, for example.

[Operation]

In the embodiment, the light coming from the backlight 10 is modulated by each of the pixels 31 of the panel section 30, and then any predetermined image light is provided to the barrier section 40. Thereafter, the image light is partially blocked by the light-blocking region 41 of the barrier section 40, and the remaining light passed through the transmissive regions 42 is emitted from the image display surface of the display panel 20. The light emitted from the image display surface forms an image at a predetermined position (perspective) on the line segment parallel to the first appropriate-viewing direction d1, thereby generating 2D image (planar image). Also the light emitted from the image display surface forms an image at a predetermined position (perspective) on the line segment parallel to the second appropriate-viewing direction d2, thereby generating 2D image (planar image), for example.

[Effect]

In the embodiment, the transmissive regions 42 of the barrier section 40 are each configured to make entirely visible any one pixel therethrough when viewed from the first or second appropriate-viewing direction d1 or d2. This means that the sub-pixels visible in the transmissive region 42 belong to the same pixel. Moreover, the pixels 31 are arranged not in stripes but differently. Therefore, the color moiré is reduced without displacing the transmissive regions 42 not to match the pixel arrangement. As such, in the embodiment, degradation of the image quality at the time of multi-view display is allowed to be suppressed.

Also in the embodiment, in the two first pixels 31A adjacent to each other in the vertical direction, the sub-pixels 32 are laid out differently, and in the two first pixels 31A adjacent to each other in the diagonal direction, the sub-pixels 32 are also laid out differently. Moreover, in the two second pixels 31B adjacent to each other in the vertical direction, the sub-pixels 32 are laid out differently, and in the two second pixels 31B adjacent to each other in the diagonal direction, the sub-pixels 32 are also laid out differently. Therefore, the color moiré is reduced without displacing the transmissive regions 42 not to match the pixel arrangement.

Also in the embodiment, the light-blocking sections 33A and 33B are alternately arranged in the row direction with one pixel 31 sandwiched therebetween, and in the column direction, are alternately arranged with no pixel 31 sandwiched therebetween. Moreover, the transmissive regions 42 are each provided at the position matching the corresponding light-blocking section 33A, and the light-blocking region 41 and the transmissive regions 42 are arranged roughly in a checkered pattern (in other words, alternately in the row and column directions). Therefore, the color moiré is reduced even if the transmissive regions 42 are provided at positions matching the pixel arrangement.

Also in the embodiment, when the transmissive regions 42 are each provided in the region opposing to the corresponding light-blocking section 33A, the viewer H may not see any unnecessary image when he or she views the display panel 20 from the front.

2. Modification Examples

In the embodiment described above, the pixels 31 each include one each of the three sub-pixels 32R, 32G, and 32B of R, G, and B that are arranged in the row direction. However, the color type and the number of the sub-pixels 32 in each of the pixels 31 are not restricted to those described above. Moreover, the arrangement of the sub-pixels 32R, 32G, and 32B in each of the pixels 31 is not also restricted to that described above.

Modification Example 1

Figure 4A:
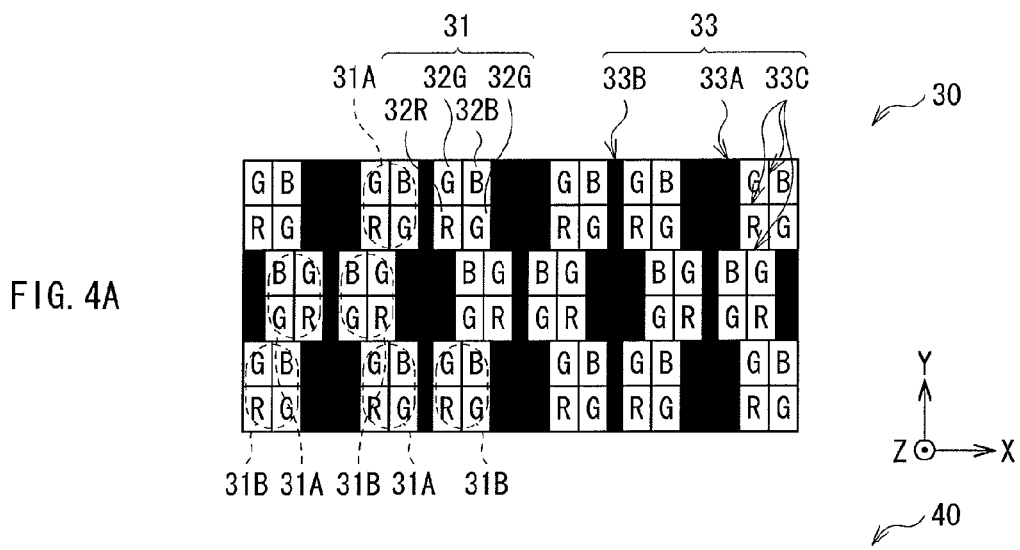
FIG. 4A is a diagram showing an exemplary configuration in a planar view of the panel section of FIG. 1 according to Modification Example 1.

Alternatively, as shown in FIG. 4A, the pixels 31 may be each configured by one sub-pixel 32R, two sub-pixels 32G and one sub-pixel 32B.

In this modification example, the pixels 31 are not arranged in stripes but differently. In an exemplary arrangement, as shown in FIG. 4A, the pixels 31 are arranged alternately (in a staggered manner) in the column direction and in line in the row direction. The pixels 31 are each configured by the four sub-pixels 32, and these four sub-pixels 32 are in the 2-by-2 layout. In the pixels 31, the sub-pixels 32 are laid out differently on a row basis. As an example, the pixels 31 in a row each include the sub-pixels being in the layout of B and G on the right side and R and G on the left side, and the pixels 31 in another row each include the sub-pixels being in the layout of R and G on the right side and B and G on the left side.

Between the pixels 31 or between the sub-pixels 32, the black section 33 as a light-blocking section is provided. As shown in FIG. 4A, for example, the black section 33 is located around each of the pixels 31, and includes the light-blocking sections 33A and 33B. The area of the light-blocking section 33A is of the pixel level (the area is equal to or substantially equal to that of the pixel 31, for example), and the area of the light-blocking section 33B is smaller than that of the light-blocking section 33A. The light-blocking sections 33A and 33B are arranged alternately in the two-dimensional plane. As an exemplary arrangement, the light-blocking sections 33A and 33B are alternately arranged in the lateral direction with one pixel 31 sandwiched therebetween, and in the vertical direction, are alternately arranged with no pixel 31 sandwiched therebetween.

As shown in FIG. 4A, for example, the black section 33 also includes the light-blocking section 33C between the sub-pixels 32 in the pixel 31. The area of the light-blocking section 33C is smaller than that of the light-blocking section 33B. The black section 33 includes such a light-blocking section 33C also between the pixels 31 positioned in the vertical direction (the column direction) with respect to each other.

Figure 4B:
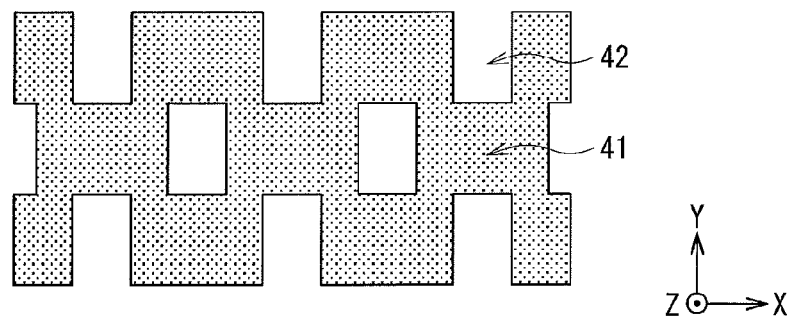
FIG. 4B is a diagram showing an exemplary configuration in a planar view of the barrier section of FIG. 1 according to Modification Example 1.

The barrier section 40 is in such a barrier pattern as exemplarily shown in FIG. 4B, that is, a barrier pattern of including a plurality of transmissive regions 42 that are arranged two-dimensionally, and including a light-blocking region 41 that is arranged to be around each of the transmissive regions 42.

As shown in FIG. 4B, for example, the transmissive regions 42 are so arranged as to be displaced by a half pitch on a row basis, and thus the light-blocking region 41 and the transmissive regions 42 are arranged roughly in a checkered pattern (in other words, alternately in the row and column directions).

As for the transmissive region 42, as shown in FIG. 4B, for example, the area thereof is of the pixel level (the area is equal to or substantially equal to that of the pixel 31, for example), and the shape and size thereof are the same or almost the same as those of the pixel 31. As shown in FIG. 4B, for example, the transmissive regions 42 are arranged with a pitch of about three pixels in the row direction, and with a pitch of about two pixels in the column direction. In other words, any two transmissive regions 42 adjacent to each other in the row direction have a gap of about two pixels therebetween, and any two transmissive regions 42 adjacent to each other in the column direction have a gap of about one pixel therebetween.

Figure 4C:
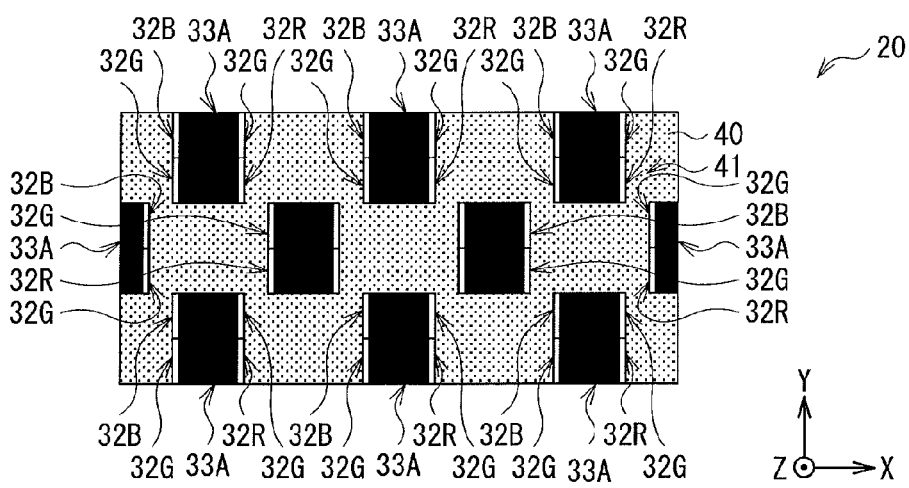
FIG. 4C is a diagram showing an exemplary combined configuration of the panel section of FIG. 4A and the barrier section of FIG. 4B in a planar view.

The transmissive regions 42 are each disposed at the position matching the corresponding light-blocking section 33A, and as exemplarily shown in FIG. 4C, are each disposed at the position opposing to the corresponding light-blocking section 33A. On the other hand, the light-blocking region 41 is disposed at the position matching the pixels 31 and the light-blocking sections 33B and 33C, and as exemplarily shown in FIG. 4C, is disposed at the position opposing to the pixels 31 and the light-blocking sections 33B and 33C.

Similarly to the embodiment described above, the barrier section 40 is so disposed as to make visible any predetermined pixel 31 (the first pixel 31A) via the corresponding transmissive region 42 when the viewer H views the display panel 20 from the first appropriate-viewing direction d1. In other words, the transmissive regions 42 are each so configured as to allow entire viewing of any one pixel from one transmissive region 42 when the viewer H views the display panel 20 from the first appropriate-viewing direction d1.

Also similarly to the embodiment described above, the barrier section 40 is so disposed as to make visible any of the pixels 31 other than the first pixel 31A (the second pixel 31B) via the corresponding transmissive region 42 when the viewer H views the display panel 20 from the second appropriate-viewing direction d2. In other words, the transmissive regions 42 are each so configured as to allow entire viewing of any one pixel from one transmissive region 42 when the viewer H views the display panel 20 from the second appropriate-viewing direction d2.

The first and second pixels 31A and 31B are alternately arranged in the lateral direction, and are alternately arranged also in the vertical direction. The first pixel 31A is located adjacent to the right of the light-blocking section 33A, and the second pixel 31B is located adjacent to the left thereof. Similarly, the first pixel 31A is located adjacent to the left of the light-blocking section 33B, and the second pixel 31B is located adjacent to the right thereof.

Herein, in the two first pixels 31 adjacent to each other in the diagonal direction (in FIG. 4A, in the first pixel 31A in the first row and the first pixel 31A in the second row, for example), the sub-pixels 32 are laid out differently. Further, in the two second pixels 31B adjacent to each other in the diagonal direction (in FIG. 4A, in the second pixel 31B in the first row and the second pixel 31B in the second row, for example), the sub-pixels 32 are laid out differently.

As shown in FIG. 4C for example, when the transmissive regions 42 are each disposed at the position opposing to the corresponding light-blocking section 33A, the light-blocking sections 33A are visible via the transmissive regions 42 when the viewer H views the display panel 20 from the front.

In this case, as shown in FIG. 4C, for example, in a certain transmissive region 42 (referred to as transmissive region 42*a* (not shown)), when the viewer H views the display panel 20 from the front, he or she sees not only the light-blocking section 33A but also a part of the sub-pixels 32R and 32G on the right side thereof. Moreover, the viewer H also sees a part of the sub-pixels 32G and 32B on the left side of the light-blocking section 33A. The transmissive region 42*a* is arranged to correspond to the pixel row in which the pixels 31 each include the sub-pixels being in the layout of R and G on the right side and G and B on the left side.

Similarly, as shown in FIG. 4C, for example, in another transmissive region 42 (referred to as transmissive region 42*b* (not shown)), when the viewer H views the display panel 20 from the front, he or she sees not only the light-blocking section 33A but also a part of the sub-pixels 32R and 32G on the left side thereof. Moreover, the viewer H also sees a part of the sub-pixels 32G and 32B on the right side of the light-blocking section 33A. The transmissive region 42*b* is arranged to correspond to the pixel row in which the pixels 31 each include the sub-pixels being in the layout of B and G on the right side and R and G on the left side.

When the viewing direction of the viewer H is changed from the first appropriate-viewing direction d1 to the second appropriate-viewing direction d2 with respect to the front, for example, the color appearing in the transmissive regions 42*a* and 42*b* is different from the color disappearing therefrom. There thus is no possibility of causing the color moiré when the viewing direction of the viewer H is changed from the first appropriate-viewing direction d1 to the second appropriate-viewing direction d2 with respect to the front, for example.

[Operation]

In this modification example, the light coming from the backlight 10 is modulated by each of the pixels 31 of the panel section 30, and then any predetermined image light is provided to the barrier section 40. Thereafter, the image light is partially blocked by the light-blocking region 41 of the barrier section 40, and the remaining light passed through the transmissive regions 42 is emitted from the image display surface of the display panel 20. The light emitted from the image display surface forms an image at a predetermined position (perspective) on the line segment parallel to the first appropriate-viewing direction d1, thereby generating 2D image (planar image). Also the light emitted from the image display surface forms an image at a predetermined position (perspective) on the line segment parallel to the second appropriate-viewing direction d2, thereby generating 2D image (planar image), for example.

[Effect]

In this modification example, the transmissive regions 42 of the barrier section 40 are each configured to make entirely visible any one pixel therethrough when viewed from the first or second appropriate-viewing direction d1 or d2. This means that the sub-pixels visible in the transmissive region 42 belong to the same pixel. Moreover, the pixels 31 are arranged not in stripes but differently. Therefore, the color moiré is reduced without displacing the transmissive regions 42 not to match the pixel arrangement. As such, in this modification example, degradation of the image quality at the time of multi-view display is allowed to be suppressed.

Also in the modification example, in the two first pixels 31A adjacent to each other in the diagonal direction, the sub-pixels 32 are laid out differently. Moreover, in the two second pixels 31B adjacent to each other in the diagonal direction, the sub-pixels 32 are also laid out differently. Therefore, the color moiré is reduced without displacing the transmissive regions 42 not to match the pixel arrangement.

Also in the modification example, the light-blocking sections 33A and 33B are alternately arranged in the row direction with one pixel 31 sandwiched therebetween, and in the column direction, are alternately arranged with no pixel 31 sandwiched therebetween. Moreover, the transmissive regions 42 are each provided at the position matching the corresponding light-blocking section 33A, and the light-blocking region 41 and the transmissive regions 42 are arranged roughly in a checkered pattern (in other words, alternately in the row and column directions). Therefore, the color moiré is reduced even if the transmissive regions 42 are provided at positions matching the pixel arrangement.

Modification Example 2

Figure 5A:
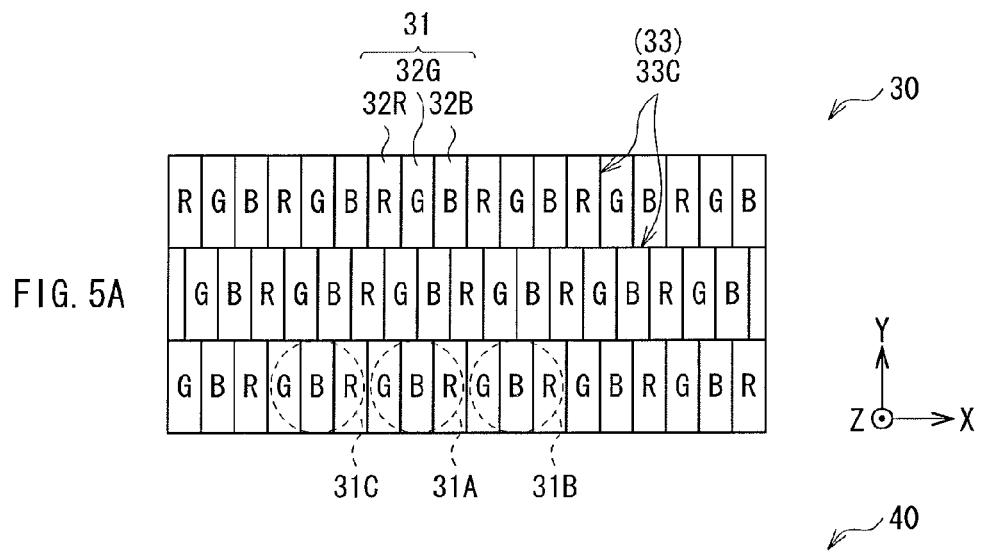
FIG. 5A is a diagram showing an exemplary configuration in a planar view of the panel section of FIG. 1 according to Modification Example 2.
Figure 5B:
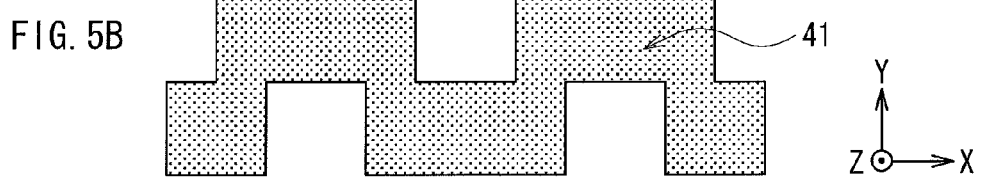
FIG. 5B is a diagram showing an exemplary configuration in a planar view of the barrier section of FIG. 1 according to Modification Example 2.
Figure 5C:
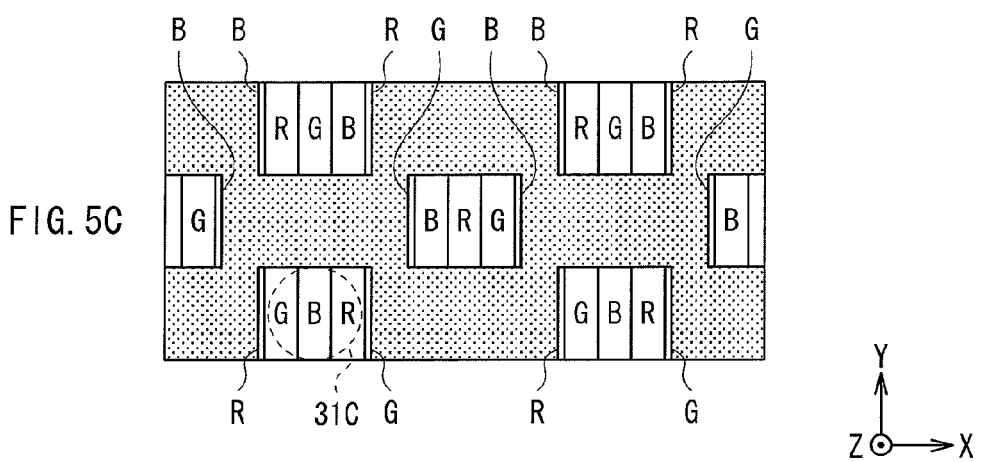
FIG. 5C is a diagram showing an exemplary combined configuration of the panel section of FIG. 5A and the barrier section of FIG. 5B in a planar view.

As an alternative arrangement, the pixels 31 may be disposed at the position where the light-blocking sections 33A are provided in the embodiment described above, and the light-blocking sections 33C may be disposed at the position where the light-blocking sections 33B are provided therein. If this is the arrangement, as shown in FIG. 5A, for example, the display region of the panel section 30 includes a plurality of sub-pixels 32, which are arranged two-dimensionally with the light-blocking section 33C each provided therebetween. In other words, the light-blocking sections 33C are in a mesh-like structure with each width thereof being narrower than that of the sub-pixel 32. In this case, when the viewer H views the display panel 20 from the front, as exemplarily shown in FIG. 5C, in each of the transmissive regions 42, the corresponding pixel 31 is visible instead of the light-blocking section 33A. To be specific, the transmissive regions 42 are each provided at the position matching any of the pixels 31 other than the first and second pixels 31A and 31B.

However, in this modification example, similarly to the embodiment described above, the sub-pixels 32 in each of the pixels 31 are arranged not in stripes but differently. Therefore, the color moiré is reduced without displacing the transmissive regions 42 not to match the pixel arrangement. As such, degradation of the image quality at the time of multi-view display is allowed to be suppressed.

Moreover, in this modification example, in the two first pixels 31A adjacent to each other in the vertical direction, the sub-pixels 32 are laid out differently, and in the two first pixels 31A adjacent to each other in the diagonal direction, the sub-pixels 32 are also laid out differently. Moreover, in the two second pixels 31B adjacent to each other in the vertical direction, the sub-pixels 32 are laid out differently, and in the two second pixels 31B adjacent to each other in the diagonal direction, the sub-pixels 32 are also laid out differently. Therefore, the color moiré is reduced without displacing the transmissive regions 42 not to match the pixel arrangement.

Modification Example 3

Figure 6A:
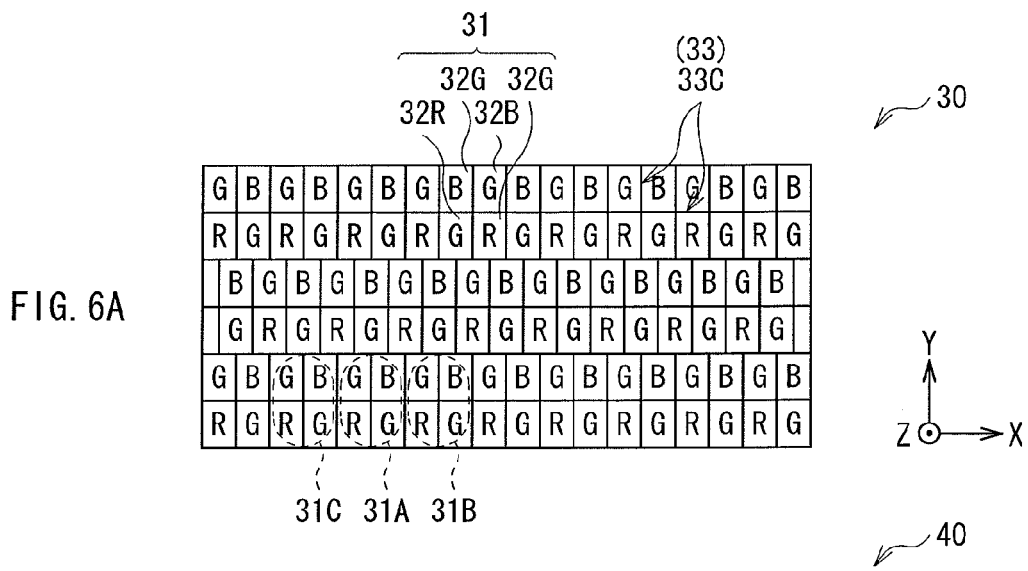
FIG. 6A is a diagram showing an exemplary configuration in a planar view of the panel section of FIG. 1 according to Modification Example 3.
Figure 6B:
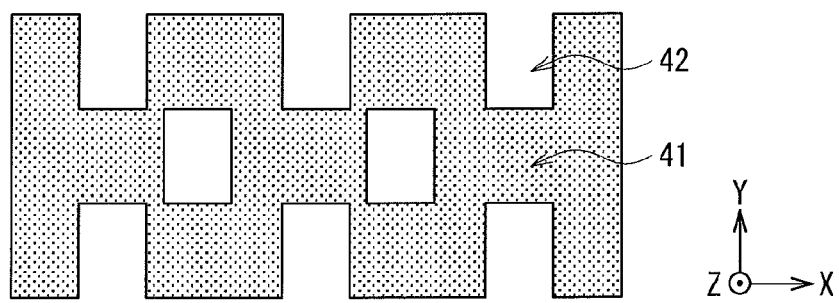
FIG. 6B is a diagram showing an exemplary configuration in a planar view of the barrier section of FIG. 1 according to Modification Example 3.
Figure 6C:
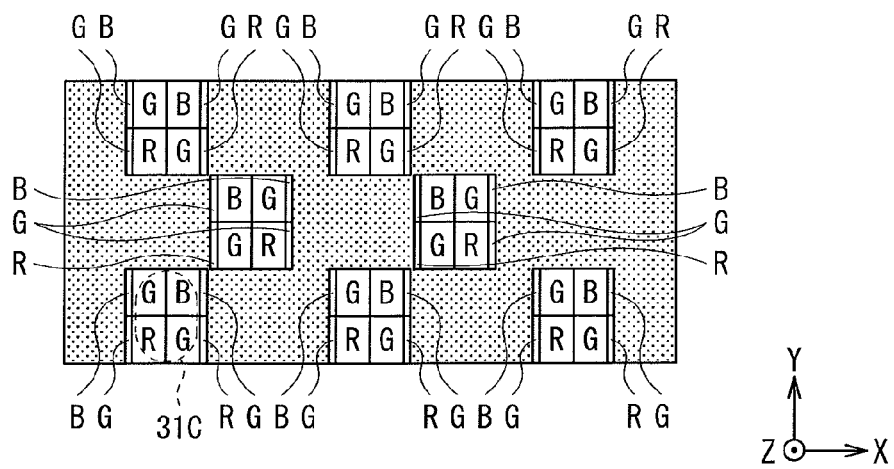
FIG. 6C is a diagram showing an exemplary combined configuration of the panel section of FIG. 6A and the barrier section of FIG. 6B in a planar view.

As an alternative arrangement, the pixels 31 may be disposed at the position where the light-blocking sections 33A are provided in Modification Example 1 described above, and the light-blocking sections 33C may be disposed at the position where the light-blocking sections 33B are provided therein. If this is the arrangement, as shown in FIG. 6A, for example, the display region of the panel section 30 includes a plurality of sub-pixels 32, which are arranged two-dimensionally with the light-blocking section 33C each provided therebetween. In this case, when the viewer H views the display panel 20 from the front, as exemplarily shown in FIG. 6C, in each of the transmissive regions 42, the corresponding pixel 31 is visible instead of the light-blocking section 33A.

However, in this modification example, similarly to Modification Example 1 described above, the sub-pixels 32 in each of the pixels 31 are arranged not in stripes but differently. Therefore, the color moiré is reduced without displacing the transmissive regions 42 not to match the pixel arrangement. As such, degradation of the image quality at the time of multi-view display is allowed to be suppressed.

Moreover, in this modification example, in the two first pixels 31A adjacent to each other in the diagonal direction, the sub-pixels 32 are also laid out differently. Moreover, in the two second pixels 31B adjacent to each other in the diagonal direction, the sub-pixels 32 are also laid out differently. Therefore, the color moiré is reduced without displacing the transmissive regions 42 not to match the pixel arrangement.

3. Application Example

Figure 7:
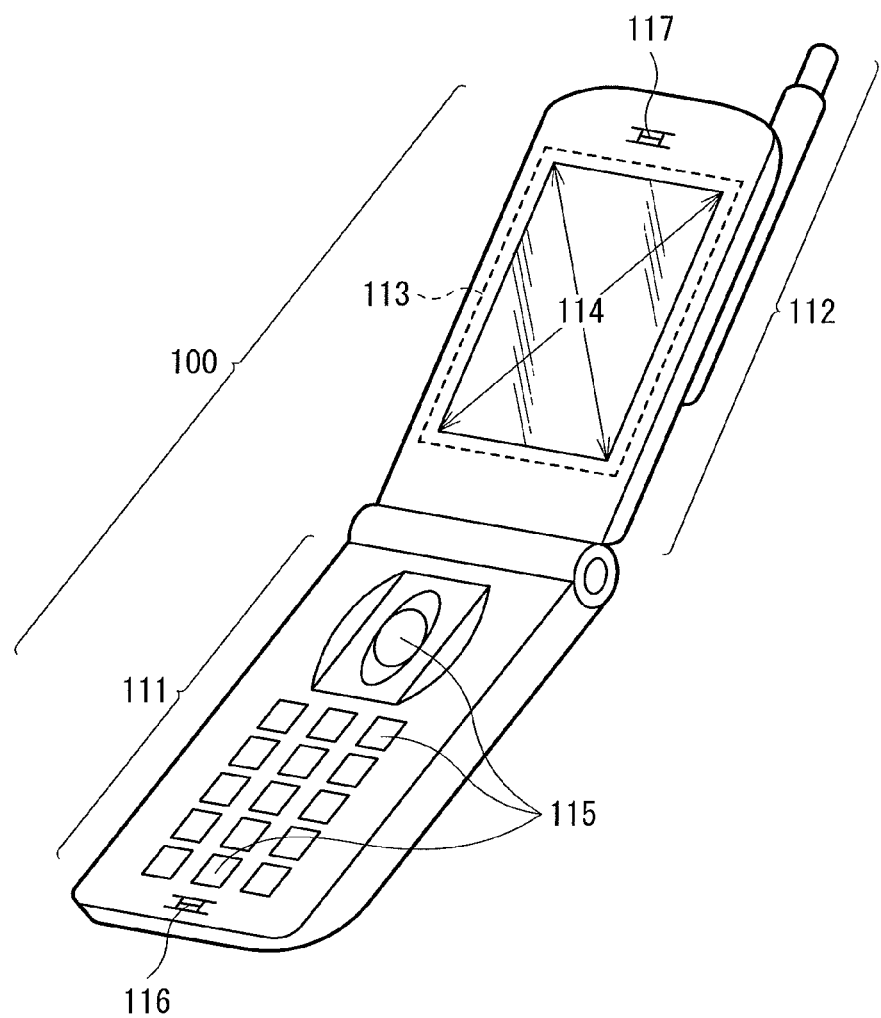
FIG. 7 is a perspective view of an exemplary electronic unit according to an application example.

Described next is an application example of the display device 1 in the embodiment and modification examples described above. FIG. 7 is a perspective view of an electronic unit 100 in this application example, showing an exemplary schematic configuration thereof. The electronic unit 100 is a mobile phone, and as exemplarily shown in FIG. 7, is provided with a main body section 111, and a display body section 112. The display body section 112 is provided to be open and close with respect to the main body section 111. The main body section 111 includes operation buttons 115, and a phone mouthpiece section 116. The display body section 112 includes a display device 113, and an earpiece section 117. The display device 113 is so configured as to perform various displays related to telephone communications on a display screen 114 thereof. The electronic unit 100 includes a control section (not shown) for controlling the operation of the display device 113. This control section is provided in the main body section 111 or in the display body section 112 as a part of the control section in charge of controlling the electronic unit 100 in its entirely, or as an individual section separately from the control section.

The display device 113 is in the configuration same as that of the display device 1 in the embodiment and modification examples described above. This accordingly allows the display device 113 to display thereon image excellent in image quality with less color moiré during multi-view display.

While the present technology has been described in detail by referring to the embodiment, the modification examples, and the application example, the present technology is not restrictive to the embodiment and others described above, and numerous other modification may be possibly devised.

In the embodiment, and the modification examples and the application example thereof described above, exemplified is the case that the light-blocking region 41 is made of a light-blocking member, and the transmissive regions 42 are each an aperture. Alternatively, the barrier section 40 may be in the dynamic configuration in which the optical characteristics of the light-blocking region 41 are controllable based on a control signal coming from the outside. If this is the configuration, the drive circuit may drive not only the panel section 30 but also the barrier section 40.

Note that, as an electronic unit applicable with the display device 1 in the embodiment and modification examples thereof described above, the mobile phone or others described above are surely not restrictive, and examples also include a personal computer, a liquid crystal display television, an image tape recorder of a view finder type or of a monitor direct view type, a car navigation device, a pager, an electronic notepad, a calculator, a word processor, a workstation, a picturephone, a POS (Point-Of-Sale) terminal, and others.

The present disclosure is also possibly in the following configurations.

(1) A display panel, including:
a panel section including a display region where a plurality of pixels are arranged, and a gap region provided in a gap between the pixels; and
a barrier section including a plurality of transmissive regions in a two-dimensional arrangement, and a light-blocking region to be around each of the transmissive regions, wherein
the transmissive regions are each configured to make entirely visible any one of the pixels therethrough when a viewer views the panel section not from a front but from a first or second direction via the barrier section,
the pixels are each configured by a plurality of sub-pixels varying in type, and
the sub-pixels in each of the pixels are arranged not in stripes but differently.

(2) The display panel according to (1), wherein
the pixels include a plurality of first pixels and a plurality of second pixels, the first pixels being visible through the transmissive regions when viewed from the first direction, and the second pixels being visible through the transmissive regions when viewed from the second direction,
in two of the first pixels adjacent to each other in a vertical or diagonal direction, the sub-pixels are laid out differently, and
in two of the second pixels adjacent to each other in the vertical or diagonal direction, the sub-pixels are laid out differently.

(3) The display panel according to (2), wherein
the first and second pixels are arranged alternately in a two-dimensional plane.

(4) The display panel according to any one of (1) to (3), wherein
the light-blocking section includes a first light-blocking section whose area is of a pixel level, and a second light-blocking section whose area is smaller than an area of the first light-blocking section.

(5) The display panel according to (4), wherein
the first and second light-blocking sections are arranged alternately in a two-dimensional plane.

(6) The display panel according to (5), wherein
the first and second light-blocking sections are alternately arranged in a lateral direction with one of the pixels sandwiched therebetween.

(7) The display panel according to (6), wherein
the transmissive regions are each provided at a position corresponding to the first light-blocking section.

(8) The display panel according to any one of (1) to (3), wherein
the light-blocking sections are in a mesh structure with each width thereof being narrower than a width of the sub-pixel.

(9) The display panel according to (8), wherein
the pixels include a plurality of first pixels and a plurality of second pixels, the first pixels being visible through the transmissive regions when viewed from the first direction, and the second pixels being visible through the transmissive regions when viewed from the second direction, and
the transmissive regions are each provided at a position corresponding to any of the pixels other than the first and second pixels.

(10) A display device, including:
a panel section including a display region where a plurality of pixels are arranged, and a gap region provided in a gap between the pixels;
a barrier section including a plurality of transmissive regions in a two-dimensional arrangement, and a light-blocking region to be around each of the transmissive regions; and
a drive section driving the panel section or both the panel section and the barrier section, wherein
the transmissive regions are each of a size allowing viewing of any one of the pixels entirely therethrough when a viewer views the panel section not from a front but from a first or second direction via the barrier section,
the pixels are each configured by a plurality of sub-pixels varying in type, and
the sub-pixels in each of the pixels are arranged not in stripes but differently.

(11) An electronic unit with a display device, the display device including:
a panel section including a display region where a plurality of pixels are arranged, and a gap region provided in a gap between the pixels;
a barrier section including a plurality of transmissive regions in a two-dimensional arrangement, and a light-blocking region to be around each of the transmissive regions; and
a drive section driving the panel section or both the panel section and the barrier section, wherein
the transmissive regions are each configured to make entirely visible any one of the pixels therethrough when a viewer views the panel section not from a front but from a first or second direction via the barrier section,
the pixels are each configured by a plurality of sub-pixels varying in type, and the sub-pixels in each of the pixels are arranged not in stripes but differently.

The present disclosure contains subject matter related to that disclosed in Japanese Priority Patent Application JP 2011-101412 filed in the Japan Patent Office on Apr. 28, 2011, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A display panel, comprising:
   a panel section including a display region where a plurality of pixels are arranged, and a light-blocking panel section provided in a gap between the pixels; and
   a barrier section including a plurality of transmissive regions in a two-dimensional arrangement, and a light-blocking region around each of the transmissive regions,
   wherein,
      the transmissive regions are each configured to make entirely visible any one of the pixels therethrough when a viewer views the panel section not from a front but from a first or second direction via the barrier section,
      each of the pixels comprises a plurality of sub-pixels of different types,
      the pixels are arranged alternately in a column direction and in a row direction, and
      the pixels are positioned shifted in the row direction, by a half width of each pixel, from the pixels of an adjacent row.

2. The display panel according to claim 1, wherein:
   the pixels include a plurality of first pixels and a plurality of second pixels, the first pixels being visible through the transmissive regions when viewed from the first direction, and the second pixels being visible through the transmissive regions when viewed from the second direction,
   in two of the first pixels adjacent to each other in a vertical or diagonal direction, the sub-pixels are laid out differently, and
   in two of the second pixels adjacent to each other in the vertical or diagonal direction, the sub-pixels are laid out differently.

3. The display panel according to claim 1, wherein a first light-blocking panel section and a second light-blocking panel section of the light-blocking panel section are arranged alternately in a two-dimensional plane.

4. The display panel according to claim 3, wherein the first and second light-blocking panel sections are alternately arranged in a lateral direction with one of the pixels sandwiched therebetween.

5. The display panel according to claim 4, wherein the transmissive regions are each provided at a position corresponding to the first light-blocking panel section.

6. A display device, comprising:
   a panel section including a display region where a plurality of pixels are arranged, and a shielding panel section provided in a gap between the pixels;
   a barrier section including a plurality of transmissive regions in a two-dimensional arrangement, and a light-blocking region around each of the transmissive regions; and
   a drive section driving the panel section or both the panel section and the barrier section,
   wherein,
      the transmissive regions are each of a size allowing viewing of any one of the pixels entirely therethrough when a viewer views the panel section not from a front but from a first or second direction via the barrier section,
      each of the pixels comprises a plurality of sub-pixels of different types,
      the pixels are arranged alternately in a column direction and in a row direction, and
      the pixels are positioned shifted in the row direction, by a half width of each pixel, from the pixels of an adjacent row.

7. An electronic unit with a display device, the display device comprising:
   a panel section including a display region where a plurality of pixels are arranged, and a light-blocking panel section provided in a gap between the pixels;
   a barrier section including a plurality of transmissive regions in a two-dimensional arrangement, and a light-blocking region to be around each of the transmissive regions; and
   a drive section driving the panel section or both the panel section and the barrier section,
   wherein,
      the transmissive regions are each configured to make entirely visible any one of the pixels therethrough when a viewer views the panel section not from a front but from a first or second direction via the barrier section,
      each of the pixels comprises a plurality of sub-pixels of different types,
      the pixels are arranged alternately in a column direction and in a row direction, and
      the pixels are positioned shifted in the row direction, by a half width of each pixel, from the pixels of an adjacent row.

* * * * *